(12) United States Patent
Takenaka et al.

(10) Patent No.: US 7,952,240 B2
(45) Date of Patent: May 31, 2011

(54) ROTARY ELECTRIC MACHINE

(75) Inventors: Masayuki Takenaka, Anjo (JP); Yasunari Furuta, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 20 days.

(21) Appl. No.: 12/458,943

(22) Filed: Jul. 28, 2009

(65) Prior Publication Data

US 2010/0045125 A1 Feb. 25, 2010

(30) Foreign Application Priority Data

Aug. 22, 2008 (JP) .................. 2008-214642

(51) Int. Cl.
*H02K 9/00* (2006.01)
(52) U.S. Cl. ............... 310/54; 310/57; 310/58; 310/260
(58) Field of Classification Search .................. 310/54, 310/56–59, 64, 260
See application file for complete search history.

(56) References Cited

U.S. PATENT DOCUMENTS

| | | | | |
|---|---|---|---|---|
| 2,583,804 A | * | 1/1952 | Andrus | 310/87 |
| 2,873,393 A | * | 2/1959 | Baudry | 310/55 |
| 3,574,325 A | * | 4/1971 | Agarwal | 188/156 |
| 3,995,181 A | * | 11/1976 | Suit | 310/58 |

FOREIGN PATENT DOCUMENTS

| | | |
|---|---|---|
| JP | U 64-30655 | 2/1989 |
| JP | A 02-79746 | 3/1990 |
| JP | A 02-228230 | 9/1990 |
| JP | U 07-27270 | 5/1995 |
| JP | A 2005-310585 | 11/2005 |
| JP | A-2006-271150 | 10/2006 |
| JP | A-2007-312569 | 11/2007 |

OTHER PUBLICATIONS

English-language Translation of International Search Report mailed Nov. 17, 2009 for National Phase Application No. PCT/JP2009/064458.

* cited by examiner

*Primary Examiner* — Dang D Le
(74) *Attorney, Agent, or Firm* — Oliff & Berridge, PLC

(57) ABSTRACT

A rotary electric machine having a stator including a coil; and a cooling unit that cools a coil end of the coil, which projects in an axial direction of the stator, wherein the cooling unit includes: an outer periphery cooling portion that is disposed along an outer peripheral surface of the coil end and includes a plurality of injection holes that inject a cooling medium onto the outer peripheral surface; and an end surface cooling portion that is disposed along an axial end surface of the coil end and includes a plurality of injection holes that inject the cooling medium onto the axial end surface.

21 Claims, 3 Drawing Sheets

ROTARY ELECTRIC MACHINE

INCORPORATION BY REFERENCE

The disclosure of Japanese Patent Application No. 2008-214642 filed on Aug. 22, 2008 including the specification, drawings and abstract is incorporated herein by reference in its entirety.

BACKGROUND

The present invention relates to a rotary electric machine including a stator having a coil and a cooling unit that cools a coil end of the coil, which projects in an axial direction of the stator.

A rotary electric machine is used conventionally in various devices as a driving power supply. A large output is often required of this type of rotary electric machine, and therefore a large amount of heat is generated from various parts of the rotary electric machine, in particular a coil and a permanent magnet. The causes of this heat generation from the rotary electric machine include copper loss and iron loss. Copper loss occurs invariably when a current is caused to flow into the coil, regardless of the magnitude of the current, and increases in proportion to the square of the current flowing into the coil. Iron loss, meanwhile, is constituted by hysteresis loss and eddy current loss, and occurs when a magnetic material is located within an alternating field. Hysteresis loss occurs when a magnetic field orientation of a magnetic domain of an iron core is varied by the alternating field, and eddy current loss is caused by an eddy current generated during magnetic flux variation in a conductor. These losses are emitted in the form of thermal energy, in other words, Joule heat, leading to heat generation in the coil and the permanent magnet of the rotary electric machine.

When this heat generation becomes excessive, dielectric breakdown may occur in the coil, or more specifically in an insulation varnish insulating lead wires of the coil from each other or insulating paper insulating phase coils from each other. Therefore, a rotary electric machine may be provided with a cooling device capable of appropriately cooling a coil provided in the rotary electric machine. A cooling device that cools an electric motor serving as a rotary electric machine provided in a power transmission apparatus for a vehicle (Japanese Patent Application Publication No. JP-A-2007-312569, for example) is known as an example of this type of cooling device.

The cooling device described in Japanese Patent Application Publication No. JP-A-2007-312569 includes an annular oil pipe that cools an annular coil end that projects in an axial direction from, and forms a circumferential continuation of, an end surface of a stator provided in an electric motor, and the oil pipe forms a circumferential continuation of the coil end. The annular oil pipe is constituted by an outer peripheral annular oil pipe disposed on an outer peripheral side of the coil end so as to overlap the coil end in the axial direction, and an inner peripheral annular oil pipe disposed on an inner peripheral side of the coil end so as to overlap the coil end in the axial direction. A plurality of discharge holes though which cooling oil is discharged toward the coil end are formed in the outer peripheral annular oil pipe and the inner peripheral annular oil pipe. By supplying the cooling oil to the outer peripheral side and the inner peripheral side of the coil end from the plurality of discharge holes, the coil end is cooled.

SUMMARY

However, the outer peripheral annular oil pipe and the inner peripheral annular oil pipe described in Japanese Patent Application Publication No. JP-A-2007-312569 are connected to a case side wall by a plurality of columnar oil pipes extending in the axial direction and simply disposed on the outer peripheral side and the inner peripheral side of the coil end. Therefore, the cooling oil cannot be supplied to an axial end surface of the coil end. Further, the outer peripheral annular oil pipe and the inner peripheral annular oil pipe have no axial reach, and therefore the layout freedom of the discharge holes relative to an inner peripheral surface and an outer peripheral surface of the coil end is reduced, resulting in partial cooling of the coil end. Moreover, the oil pipe structure has a small surface area, and it is therefore difficult to provide a large number of discharge holes in the outer peripheral annular oil pipe and the inner peripheral annular oil pipe. Hence, the cooling efficiency deteriorates. Furthermore, the annular oil pipe is connected to the case side wall by the columnar oil pipes, and therefore the processing applied to the case side wall in order to supply the cooling liquid to each of the columnar oil pipes becomes complicated. As a result, the cooling device increases in size, leading to an increase in the size of the rotary electric machine.

The present invention has been designed in consideration of the problems described above, and it is an object of the present invention to provide a rotary electric machine that can cool a coil end effectively without increasing the size of the rotary electric machine.

To achieve the object described above, a rotary electric machine according to a first aspect of the present invention is characterized to include a stator including a coil and a cooling unit that cools a coil end of the coil, which projects in an axial direction of the stator. In the rotary electric machine, the cooling unit includes: an outer periphery cooling portion that is disposed along an outer peripheral surface of the coil end and includes a plurality of injection holes that inject a cooling medium onto the outer peripheral surface; and an end surface cooling portion that is disposed along an axial end surface of the coil end and includes a plurality of injection holes that inject the cooling medium onto the axial end surface.

According to this characteristic constitution, the cooling unit injects the cooling medium onto the axial end surface of the coil end in addition to the outer peripheral surface of the coil end, and therefore the coil end can be cooled effectively. In particular, by injecting the cooling medium onto the axial end surface of the coil end, coils of respective phases arranged in sequence from the inner peripheral surface to the outer peripheral surface of the coil end can all be cooled by the cooling medium. Furthermore, the injection holes can be provided along the outer peripheral surface and the axial end surface of the coil end to face each of the outer peripheral surface and the axial end surface of the coil end, and therefore the layout freedom of the injection holes can be increased in comparison with the related art. Hence, the shape of the cooling portion can fit the shape of the coil end, and therefore an increase in the size of the rotary electric machine can be prevented.

Further, the outer periphery cooling portion and the end surface cooling portion may include a cooling medium flow passage through which the cooling medium flows so as to be supplied in common to the plurality of injection holes.

According to this constitution, a cooling medium supply path to the plurality of injection holes provided in the outer periphery cooling portion or the end surface cooling portion can be shared, and therefore the supply path can be simplified.

Further, the outer periphery cooling portion and the end surface cooling portion may be preferably formed integrally such that respective portions of the cooling medium flow passage in the outer periphery cooling portion and the end surface cooling portion communicate with each other.

According to this constitution, the number of components of the rotary electric machine can be reduced and an increase in the size of the rotary electric machine can be prevented. Further, the cooling medium supply path to the outer periphery cooling portion and the end surface cooling portion can be shared, and therefore the supply path can be simplified to a single supply path.

Further, the outer periphery cooling portion may be cylindrically formed covering the outer peripheral surface of the coil end.

According to this constitution, the injection holes can be disposed in desired circumferential and axial positions in the outer peripheral surface of the coil end. Therefore, the entire outer peripheral surface of the coil end can be cooled, and as a result, the coil end can be cooled effectively.

Further, the end surface cooling portion may be formed in an annular disc shape covering the axial end surface of the coil end.

According to this constitution, the injection holes can be disposed in desired circumferential and radial positions in the axial end surface of the coil end. Therefore, the axial end surface of the coil end can be cooled. As a result, the entire axial end surface of the coil end can be cooled effectively.

Further, the cooling unit may include a radial cross-section formed in a U shape so as to cover the outer peripheral surface, the axial end surface, and an inner peripheral surface of the coil end integrally.

According to this constitution, the injection holes can be disposed in desired positions over the entire surface of the coil end. Hence, the entire coil end can be cooled effectively. Moreover, the cooling portion that cools all of the outer peripheral surface, axial end surface, and the inner peripheral surface of the coil end can be formed integrally, and therefore the size of the rotary electric machine can be reduced. Furthermore, the structure of the cooling unit can be simplified, and therefore the cooling unit can be manufactured easily. As a result, the manufacturing cost of the cooling unit can be suppressed.

Further, the cooling unit may further include an inner periphery cooling portion that is disposed along the inner peripheral surface of the coil end and includes a plurality of injection holes that inject the cooling medium onto the inner peripheral surface of the coil end.

According to this constitution, the cooling medium can be injected onto the inner peripheral surface of the coil end in addition to the outer peripheral surface and the axial end surface. Therefore, the coil end is cooled from three directions, enabling an improvement in the cooling effect.

Further, the inner periphery cooling portion may be formed integrally with the outer periphery cooling portion and the end surface cooling portion.

According to this constitution, the number of components of the rotary electric machine can be reduced and an increase in the size of the rotary electric machine can be prevented. Further, the cooling medium supply path to the inner periphery cooling portion, the outer periphery cooling portion, and the end surface cooling portion can be shared, and therefore the supply path can be simplified to a single supply path. Hence, the structure of the supply path is simplified, and as a result, the manufacturing cost of the rotary electric machine can be suppressed.

Further, a rotor supported rotatably on a radially inner side of the stator may be further provided, and a rotor side end portion of the inner periphery cooling portion may be formed distant from an axial end surface of the rotor.

According to this constitution, a gap formed between the rotor side end portion of the inner periphery cooling portion and the axial end surface of the rotor can be used to inject the cooling medium onto the inner peripheral surface of the coil end through a flow passage formed on the rotor side. Hence, the cooling effect on the inner peripheral surface of the coil end can be improved even further.

Further, the inner periphery cooling portion may be cylindrically formed covering the inner peripheral surface of the coil end.

According to this constitution, the injection holes can be disposed in desired circumferential and axial positions in the inner peripheral surface of the coil end. Therefore, the entire inner peripheral surface of the coil end can be cooled, and as a result, the coil end can be cooled effectively.

Further, the cooling unit may be formed from an insulating material and disposed in an insulating space between a case housing the stator and the coil end.

According to this constitution, the cooling unit is disposed in an insulating space that preexists in the case, and there is therefore no need to provide a dedicated space for disposing the cooling unit. As a result, an increase in the size of the rotary electric machine can be prevented.

Further, the cooling unit may be positioned such that the outer periphery cooling portion and the end surface cooling portion are in surface contact with an inner wall of the case.

According to this constitution, there is no need to provide a dedicated positioning structure that positions the cooling unit relative to the coil end or the inner wall of the case, and therefore the structure of the cooling unit can be simplified. As a result, an increase in the size of the rotary electric machine can be prevented.

Further, the end surface cooling portion may include a terminal block that supports a terminal connected to the coil.

According to this constitution, the end surface cooling portion doubles as the terminal block that supports the terminal connected to the coil, and therefore the number of components can be reduced. Moreover, an increase in the size of the rotary electric machine can be suppressed in comparison with a case where a new terminal block is provided.

Further, the case housing the stator may include an outside communication hole communicating with the outside, the terminal block may be supported in the outside communication hole via a first seal member, and the terminal may be supported by the terminal block via a second seal member.

According to this constitution, when the terminal is taken out outside of the case and connected to an inverter or the like, the terminal can be supported on the case directly via the terminal block, which is constituted by an insulating material such as resin. Therefore, a new connection member, such as a terminal, need not be used, and as a result, the number of components can be reduced and an increase in the size of the rotary electric machine can be prevented. Furthermore, liquid-tightness can be secured between the inside and the outside of the case. Hence, situations can be prevented in which the cooling medium leaks from the case to the outside of the case, or moisture, dust, and so on enter the case from the outside of the case.

DETAILED DESCRIPTION OF EMBODIMENTS

Figure 1:
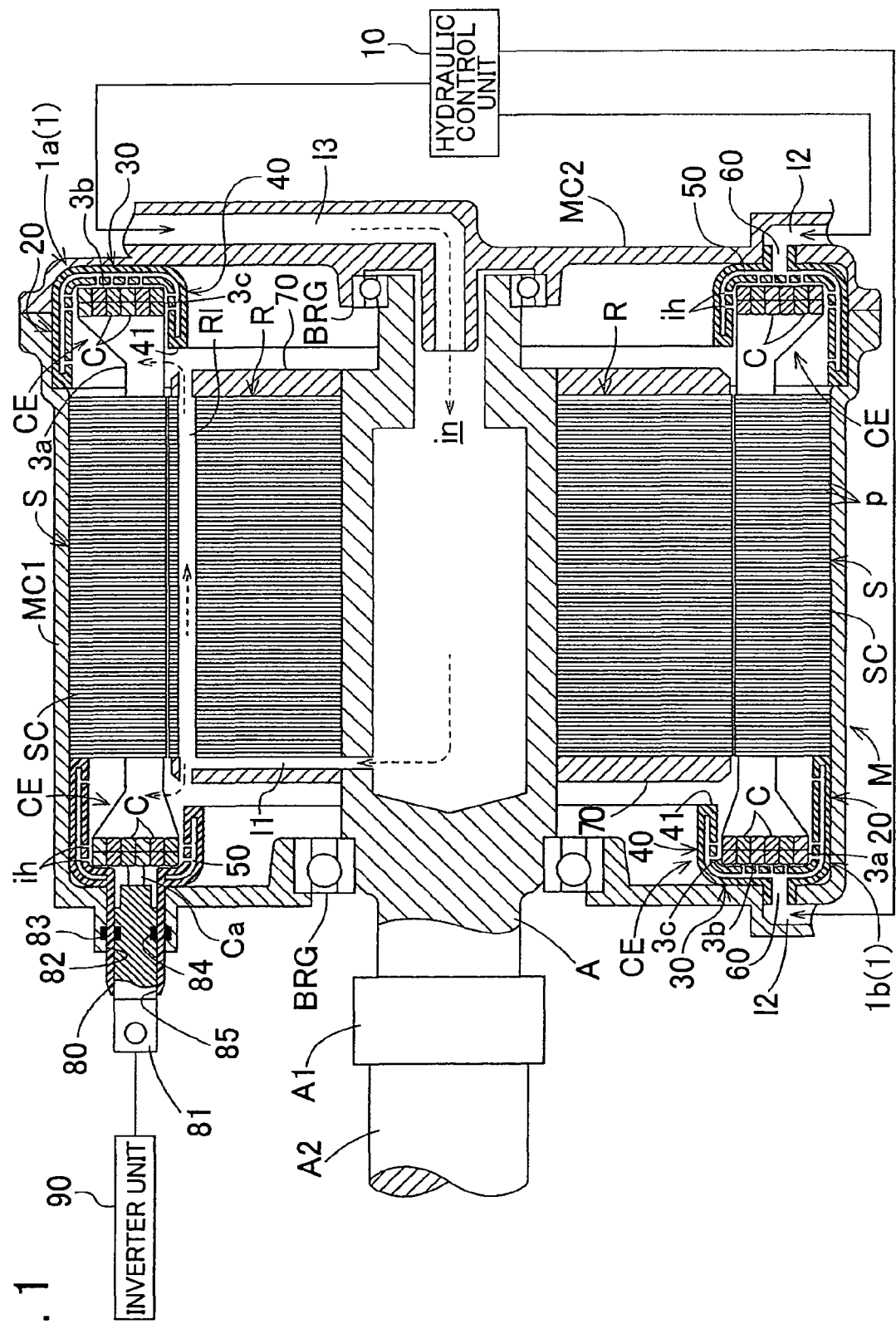
FIG. 1 is a view showing a cross-section of a rotary electric machine according to the present invention.

A rotary electric machine M according to the present invention, which includes a stator S having a coil C and a cooling unit 1 that cools a coil end CE of the coil C projecting in an axial direction of the stator S, will be described below on the basis of the drawings. FIG. 1 is a sectional view taken along a rotary shaft A of the rotary electric machine M according to this embodiment. As shown in FIG. 1, in the rotary electric machine M, the stator S and a rotor R are housed in a space formed by a case main body MC1 and a cover MC2 covering an opening portion of the case main body MC1, and the stator S is fixed to the case main body MC1. Note that the case main body MC1 and the cover MC2 correspond to a case that houses the rotary electric machine M, and therefore, when there is no need to differentiate between the case main body MC1 and the cover MC2 in the following description, they will be referred to together as a case MC1, MC2.

The rotary electric machine M according to this embodiment obtains rotary power through an electromagnetic effect between the coil C and a permanent magnet (not shown). This acquisition of rotary power is a well-known technique, and therefore description of the technique will be omitted herein. It is assumed in this embodiment that the coil C is provided in the stator S and the permanent magnet is provided in the rotor R. Note that a cooling liquid to be described below corresponds to a cooling medium in the claims of the present application. Typical cooling oil suitable for cooling the rotary electric machine M is preferably used as the cooling liquid, but the cooling liquid is not limited thereto.

The rotor R is held on the rotary shaft A, and the rotary shaft A is supported via a support bearing BRG to be rotatable relative to the case main body MC1 and the cover MC2. A plurality of permanent magnets (not shown) is disposed on the rotor R. Further, the rotor R includes a plurality of flow passages RI through which the cooling liquid is circulated through a rotor core. By circulating the cooling liquid through the flow passages R1 in the rotor core, the permanent magnets can be cooled. Cooling liquid supplied to a cooling liquid supply port in that is provided in a central portion of the rotary shaft A is supplied to the flow passages R1 via a first flow passage 11 by centrifugal force generated upon rotation of the rotary shaft A, in other words, rotation of the rotor R, and then circulated through the flow passages R1.

A connecting portion A1 is provided on one end portion of the rotary shaft A so that the rotary shaft A is connected to a power transmission shaft A2 via the connecting portion A1, and thus a driving force generated by the rotary electric machine M can be output to the outside of the rotary electric machine M. In this case, the rotary electric machine M functions as an electric motor. The rotary electric machine M can also function as a generator that generates power using a driving force transmitted to the rotary electric machine M from the outside of the rotary electric machine M.

The stator S includes a stator core SC fixed to the case main body MC1, and a coil end CE of the coil C wound around the stator core SC is positioned on an outer side of each of the two axial ends of the stator core SC. Although detailed description will be herein omitted, the stator core SC is formed by stacking a large number of ring-shaped steel plates p in an axial direction of the rotary shaft A.

The coil C is formed by winding lead wires around the stator core SC and fixed into shape in an insulated condition created by impregnating the coil C with an insulating varnish that insulates the lead wires from each other. As a result of the insulating varnish, thermal conductivity between the stator core SC and the coil C is improved, leading to an improvement in the heat radiation performance.

The structure of the rotary electric machine M according to the present invention has been schematically described above. The cooling unit 1 provided in the rotary electric machine M will be hereinafter described.

The rotary electric machine M includes the first flow passage 11 through which cooling liquid that cools the permanent magnets flows, and a second flow passage 12 through which cooling liquid that cools the coil C flows. Cooling liquid is supplied to the first flow passage 11 by a hydraulic control unit 10 via an in-case oil passage 13 provided in the case MC1, MC2 and the aforementioned cooling liquid supply port in. For this purpose, the hydraulic control unit 10 preferably includes a pump that can supply the cooling liquid. Further, a control valve that can set a pressure and a flow rate of the cooling liquid may be provided in each of the first flow passage 11, the second flow passage 12, and the in-case oil passage 13. As shown in FIG. 1, the first flow passage 11 is formed to extend from the cooling liquid supply port in to the flow passages R1 in the rotor core. The second flow passage 12 is connected to a cooling liquid inlet port 60 provided in the cooling unit 1 covering the coil end CE of the stator S, which is fixed to an inner surface of the case main body MC1.

In this embodiment, the cooling unit 1 is mainly constituted by an oil jacket that covers the coil C in order to cool the coil end CE. Therefore, in the following description, the cooling unit 1 will be described as an oil jacket 1. As described above, the coil end CE is positioned on the outer side of each of the two axial ends of the stator core SC. Accordingly, the oil jacket 1 is disposed to cover the coil end CE positioned on the outer side of each of the two axial ends of the stator core SC. Note that when it is necessary to differentiate between the oil jackets 1, the oil jackets 1 will be referred to as a first oil jacket 1a and a second oil jacket 1b for convenience.

Figure 2:
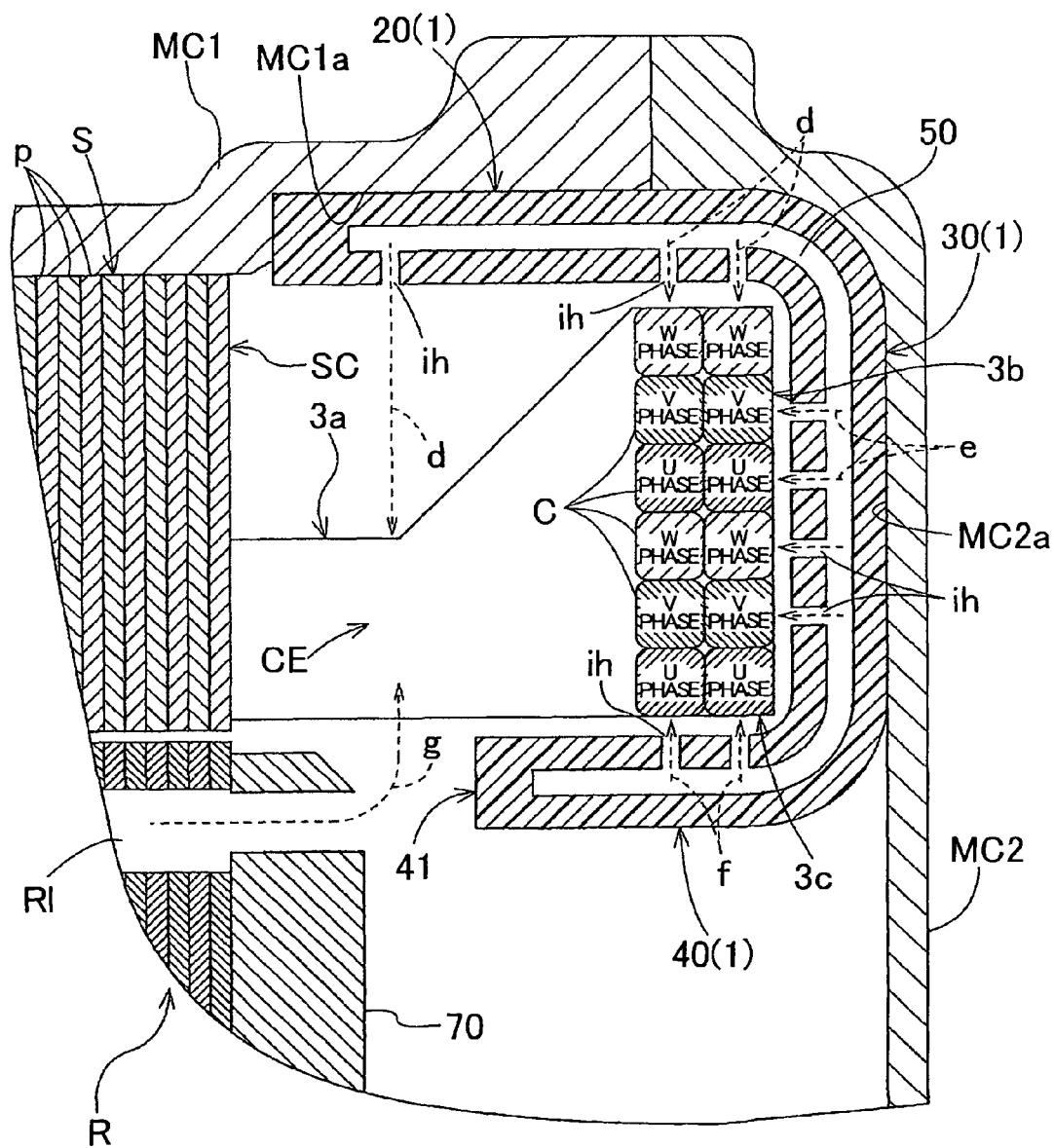
FIG. 2 is a partially enlarged view of the rotary electric machine according to the present invention.

As described above, the rotary electric machine M according to the present invention includes the oil jackets 1 that cool the respective coil ends CE. FIG. 2 is a partially enlarged view showing a portion of the coil end CE and the oil jacket 1 shown in FIG. 1 to clarify the constitution of the oil jacket 1. The oil jacket 1 includes an outer periphery cooling portion 20 that is disposed around an outer peripheral surface 3a of the coil end CE and has a plurality of injection holes ih that inject the cooling liquid onto the outer peripheral surface 3a of the coil end CE, an end surface cooling portion 30 that is disposed around an axial end surface 3b of the coil end CE and has a plurality of injection holes ih that inject the cooling liquid onto the axial end surface 3b of the coil end CE, and an inner periphery cooling portion 40 that is disposed around an inner peripheral surface 3c of the coil end CE and has a plurality of injection holes ih that inject the cooling liquid onto the inner peripheral surface 3c of the coil end CE.

Of all the surfaces of the coil end CE, the outer peripheral surface 3a of the coil end CE is the surface that faces radially outward. Further, of all the surfaces of the coil end CE, the axial end surface 3b of the coil end CE is the surface that faces one end in the axial direction of the rotary shaft A. Further, of all the surfaces of the coil end CE, the inner peripheral surface 3c of the coil end CE is the surface that faces radially inward. A plurality of the injection holes ih is formed in each of the outer periphery cooling portion 20, the end surface cooling portion 30, and the inner periphery cooling portion 40. The injection holes ih are formed to face the respective directions of the outer peripheral surface 3a, the axial end surface 3b, and the inner peripheral surface 3c such that the cooling liquid supplied from the aforementioned hydraulic control unit 10 via the second flow passage 12 can be injected toward the outer peripheral surface 3a, the axial end surface 3b, and the inner peripheral surface 3c, respectively.

The outer periphery cooling portion 20 and the end surface cooling portion 30 include a cooling medium flow passage 50 through which the cooling liquid flows so as to be supplied in common to the plurality of injection holes ih. In the inner periphery cooling portion 40, there also provided the cooling medium flow passage 50 through which the cooling liquid flows so as to be supplied in common to the plurality of injection holes ih. Accordingly, the hollow cooling medium flow passage 50 through which the cooling liquid can flow is formed in the outer periphery cooling portion 20, the end surface cooling portion 30, and the inner periphery cooling portion 40. The plurality of injection holes ih is formed such that the cooling medium is supplied in common from the cooling medium flow passage 50. The outer periphery cooling portion 20 and the end surface cooling portion 30 are formed integrally with each other such that respective portions of the cooling medium flow passage 50 in the outer periphery cooling portion 20 and the end surface cooling portion 30 communicate with each other. Further, the inner periphery cooling portion 40 is formed integrally with the outer periphery cooling portion 20 and the end surface cooling portion 30, and a portion of the cooling medium flow passage 50 in the inner periphery cooling portion 40 is formed integrally with the portions of the cooling medium flow passage 50 in the outer periphery cooling portion 20 and the end surface cooling portion 30 so as to communicate with each other.

As described above, the cooling liquid flowing through the cooling medium flow passage 50 is injected onto the respective surfaces of the coil end CE through the plurality of injection holes ih formed in the cooling medium flow passage 50. In other words, the cooling liquid that flows through the portion of the cooling medium flow passage 50 in the outer periphery cooling portion 20 is injected onto the outer peripheral surface 3a of the coil end CE, as shown by a broken line d in FIG. 2. Further, the cooling liquid that flows through the portion of the cooling medium flow passage 50 in the end surface cooling portion 30 is injected onto the axial end surface 3b of the coil end CE, as shown by a broken line e in FIG. 2. Further, the cooling liquid that flows through the portion of the cooling medium flow passage 50 in the inner periphery cooling portion 40 is injected onto the inner peripheral surface 3c of the coil end CE, as shown by a broken line f in FIG. 2.

The rotary electric machine M according to the present invention is a three-phase drive rotary electric machine M. Hence, the coil C is also formed in a three-phase constitution (U phase, V phase, W phase). As shown in FIG. 2, the lead wires of the respective phases are arranged in sequence from the inner peripheral surface 3c to the outer peripheral surface 3a of the coil end CE. Since the coil C of the rotary electric machine M according to this embodiment is formed in this manner, the coils C of respective phases can all be cooled by injecting the cooling liquid onto the axial end surface 3b of the coil end CE, in particular, as shown by the broken line e. Therefore, in this embodiment, the rotary electric machine M according to the present invention can cool the coil end CE efficiently by injecting the cooling liquid onto the coil end CE from three directions.

Here, a rotor side end portion 41 of the inner periphery cooling portion 40 is formed distant from an axial end surface 70 of the rotor R supported rotatably on a radially inner side of the stator S. As described above, the rotor R is formed with the plurality of flow passages R1 through which the cooling liquid is circulated through the rotor core. After flowing through the flow passages R1 in the rotor core, the cooling liquid is injected onto the inner peripheral surface 3c of the coil end CE from the flow passages R1 in the rotor core by a centrifugal force generated when the rotary shaft A rotates, as shown by a broken line g. Hence, the inner peripheral surface 3c of the coil end CE can also be cooled from the flow passages on the rotor R side, enabling a further improvement in the cooling effect. The rotor side end portion 41 of the oil jacket 1 and the axial end surface 70 of the rotor R are formed distant from each other so as to ensure that the cooling liquid can be injected from the flow passage R1 in the rotor core onto the coil end CE.

The oil jacket 1 is formed from an insulating material and disposed in an insulating space between the case MC1, MC2 housing the stator S and the coil end CE. Here, the lead wires forming the coil C are wound around the coil end CE. Furthermore, as described above, the lead wires are impregnated with the insulating varnish that insulates the lead wires from each other, and fixed into shape in an insulated condition. However, a large current flows through the lead wires, and the case MC1, MC2 of the rotary electric machine M may be formed from a conductor. Therefore, typically, an insulating space is formed at a predetermined insulating distance between the coil end CE and the case MC1, MC2, thereby securing insulation between the coil end CE and the case MC1, MC2. The oil jacket 1 according to the present invention is formed from an insulating material in order to secure the insulation. For example, resin may be used favorably as the insulating material. Hence, the oil jacket 1 is formed from resin or the like and disposed in the insulating space between the coil end CE and the case main body MC1 and cover MC2 housing the stator S. Since the oil jacket 1 is disposed in the insulating space that preexists in the case MC1, MC2, there is no need to provide a new space for disposing the oil jacket 1. As a result, an increase in the size of the rotary electric machine M can be prevented.

Further, the oil jacket 1 is positioned such that the outer periphery cooling portion 20 and the end surface cooling portion 30 are in surface contact with an inner wall of the case MC1, MC2. Here, the term "surface contact" indicates a state where at least the surfaces are in contact with each other. Accordingly, as shown in FIG. 2, the outer periphery cooling portion 20 is positioned such that an outer surface thereof is in surface contact with an inner wall MC1a of the case main body MC1, and the end surface cooling portion 30 is positioned such that an outer surface thereof is in surface contact with an inner wall MC2a of the cover MC2. By positioning the oil jacket 1 in this manner, the need to provide a separate positioning member is eliminated, and as a result, an increase in the number of components can be suppressed.

Returning to FIG. 1, the oil jacket 1 is structured to cover the coil end CE of the stator S from outside in the axial direction of the rotary shaft A. Hence, as described above, the rotary electric machine M is provided with the pair of oil jackets 1 that includes the first oil jacket 1a and the second oil jacket 1b. The first oil jacket 1a corresponds to the oil jacket 1 disposed on the cover MC2 side in FIG. 1, and the second oil jacket 1b corresponds to the oil jacket 1 disposed on the connecting portion A1 side in FIG. 1.

Figure 3:
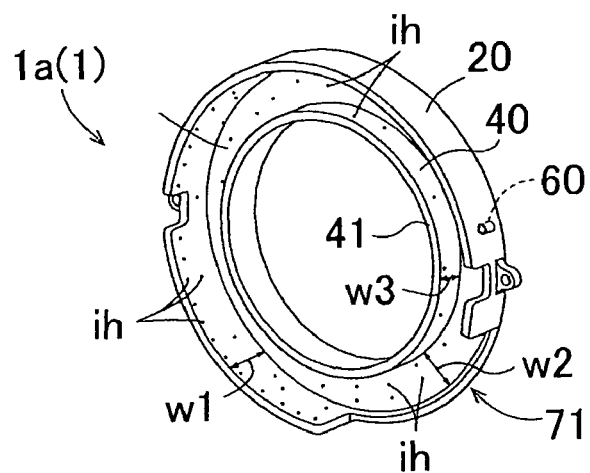
FIG. 3 is a perspective view of a first oil jacket.

FIG. 3 is a perspective view of the first oil jacket 1a. As described above, the first oil jacket 1a includes the outer periphery cooling portion 20, the end surface cooling portion 30, and the inner periphery cooling portion 40. The plurality of injection holes ih that inject the cooling liquid onto the respective surfaces of the coil end CE is formed in each of the cooling portions 20, 30 and 40. As shown in FIG. 3, the outer periphery cooling portion 20 is cylindrically formed covering the outer peripheral surface 3a of the coil end CE. More specifically, the outer periphery cooling portion 20 is cylindrically formed having a width w1 so that the outer peripheral surface 3a of the coil end CE can be covered at a predetermined width. Furthermore, since the outer periphery cooling portion 20 is formed to have the width w1, the injection holes ih can be disposed in desired circumferential and axial positions in the outer peripheral surface 3a of the coil end CE. Hence, the entire outer peripheral surface 3a of the coil end CE can be cooled, and therefore the coil end CE can be cooled effectively.

The end surface cooling portion 30 is formed in an annular disc shape covering the axial end surface 3b of the coil end CE. More specifically, the end surface cooling portion 30 is formed in an annular disc shape having a width w2 so that the axial end surface 3b of the coil end CE can be covered at a predetermined width. Furthermore, since the end surface cooling portion 30 is formed to have the width w2, the injection holes ih can be disposed in desired circumferential and radial positions in the axial end surface 3b of the coil end CE. Hence, the entire axial end surface 3b of the coil end CE can be cooled, and therefore the coil end CE can be cooled effectively.

Further, the inner periphery cooling portion 40 is cylindrically formed covering the inner peripheral surface 3c of the coil end CE. More specifically, the inner periphery cooling portion 40 is cylindrically formed having a width w3 so that the inner peripheral surface 3c of the coil end CE can be covered at a predetermined width. Furthermore, since the inner periphery cooling portion 40 is formed to have the width w3, the injection holes ih can be disposed in desired circumferential and axial positions in the inner peripheral surface 3c of the coil end CE. Hence, the entire inner peripheral surface 3b of the coil end CE can be cooled, and therefore the coil end CE can be cooled effectively.

Hence, the oil jacket 1 constituted by the outer periphery cooling portion 20, the end surface cooling portion 30 and the inner periphery cooling portion 40 includes a radial cross-section formed in a U shape, as shown in FIG. 2. Moreover, the oil jacket 1 can cover the outer peripheral surface 3a, the axial end surface 3b, and the inner peripheral surface 3c of the coil end CE integrally. Note that the axial end surface 3b corresponds to a side face of the coil end CE. Therefore, the injection holes ih can be disposed in desired positions over the entire surface of the coil end CE, and as a result, the entire coil end CE can be cooled effectively. Furthermore, the oil jacket 1 that cools all of the outer peripheral surface 3a, the axial end surface 3b, and the inner peripheral surface 3c of the coil end CE can be formed integrally, and therefore the size of the rotary electric machine M does not increase.

The first oil jacket 1a is also formed with the cooling liquid inlet port 60 through which the cooling liquid flows in and a cooling liquid outlet port 71 through which the cooling liquid flows out. As shown in FIG. 1, one end of the cooling liquid inlet port 60 communicates with the second flow passage 12 and the other end communicates with the cooling medium flow passage 50. Here, the plurality of the injection holes ih is formed in the cooling medium flow passage 50, as described above. Therefore, the first oil jacket 1a can cool the coil end CE by injecting cooling liquid supplied from the cooling liquid inlet port 60 onto the coil end CE.

The cooling liquid injected onto the coil end CE moves downward in a gravity direction within the case MC1, MC2. As described above, the first oil jacket 1a is in surface contact with the case MC1, MC2, and therefore the cooling liquid that moves downward in the gravity direction moves into a gap between the outer peripheral surface 3a of the coil end CE and the outer periphery cooling portion 20. The cooling liquid outlet port 71 through which the cooling liquid flows out is formed in the first oil jacket 1a to discharge the cooling liquid from the first oil jacket 1a so that the cooling liquid can circulate. The cooling liquid outlet port 71 is formed by partially cutting away the outer periphery cooling portion 20. The cooling liquid that flows out through the cooling liquid outlet port 71 passes through a flow passage, not shown in the drawing, and accumulates in a cooling liquid storage portion. The cooling liquid, which is warmed by heat drawn from the coil end CE, is then circulated to and cooled by an oil cooler, and then reused to cool the rotary electric machine M including the coil end CE.

Figure 4A:
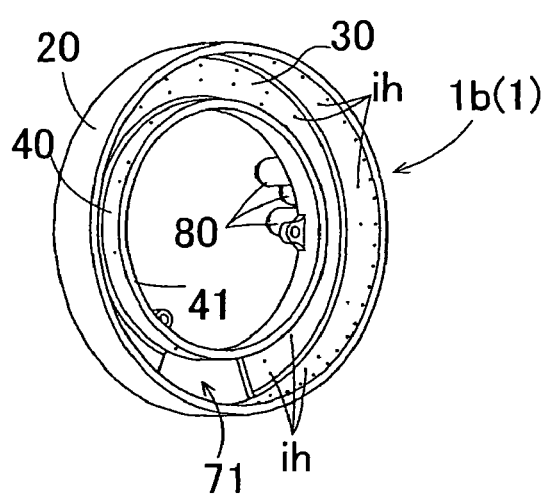
FIGS. 4A and 4B are perspective views of a second oil jacket.
Figure 4B:
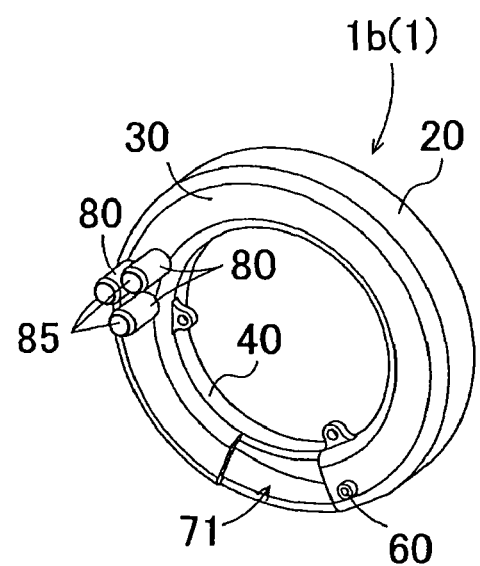

FIG. 4A is a perspective view showing the second oil jacket 1b from the side covering the coil end CE. FIG. 4B is a perspective view showing the second oil jacket 1b from the side in surface contact with the case main body MC1. As shown in FIGS. 4A and 4B, the second oil jacket 1b includes the outer periphery cooling portion 20, the end surface cooling portion 30, and the inner periphery cooling portion 40, similarly to the first oil jacket 1a. The plurality of injection holes ih that inject cooling liquid onto the respective surfaces of the coil end CE is formed in each of the cooling portions 20, 30 and 40. The second oil jacket 1b is also formed with the cooling liquid inlet port 60 through which the cooling liquid flows in and the cooling liquid outlet port 71 through which the cooling liquid flows out. As described above, the cooling liquid outlet port 71 of the first oil jacket 1a is formed in the outer periphery cooling portion 20. The cooling liquid outlet port 71 of the second oil jacket 1b, on the other hand, is formed by providing an opening portion in a portion of the end surface cooling portion 30. Even when the cooling liquid outlet port 71 is provided in the end surface cooling portion 30 in this manner, the cooling liquid that moves between the coil end CE and the outer periphery cooling portion 20 can accumulate in the cooling liquid storage portion through a flow passage not shown in the drawings.

Further, as shown in FIGS. 4A and 4B, the end surface cooling portion 30 of the second oil jacket 1b includes a terminal block 80 that supports a terminal 81 (see FIG. 1) connected to the coil end CE. The terminal block 80 is formed from three cylindrical members, as shown in FIGS. 4A and 4B. Here, the rotary electric machine M according to the present invention is a three-phase drive rotary electric machine M. Therefore, the coil C is also constituted by three phases, namely a U phase, a V phase, and a W phase. A lead wire end portion Ca of the lead wire of each phase is connected to the terminal 81 in order to form a connection with an inverter unit 90 that conducts a current for driving the rotary electric machine M to the coil C. This connection is preferably formed by bundling together and crimping the lead wire end portions Ca of the respective phases. The terminal 81 is supported by the terminal block 80.

The case main body MC1 housing the stator S includes an outside communication hole 82 that communicates with the outside. The terminal block 80 is supported in the outside communication hole 82 via a first seal member 83, and the terminal 81 is supported on the terminal block 80 via a second seal member 84. More specifically, the outside communication hole 82 is formed in the case main body MC1 to connect the inside of the case main body MC1 to the outside. The outside communication hole 82 is a round hole penetrating a cylindrical portion formed to project outward in the axial direction from the case main body MC1. The terminal block 80 of the second oil jacket 1b is inserted into the outside communication hole 82 so as to be supported in the outside communication hole 82. The first seal member 83 is provided between an inner peripheral surface of the outside communication hole 82 and an outer peripheral surface of the terminal block 80 to secure liquid-tightness between the inside and the outside the case main body MC1. The first seal member 83 is preferably an O-ring, for example.

Here, the terminal block 80 is formed with a hole 85 to connect the inside and the outside of the oil jacket 1b. When the second oil jacket 1b is laid over the coil end CE, the columnar terminal 81 is supported on the terminal block 80 while inserted into the hole 85. The second seal member 84 is provided between an inner peripheral surface of the terminal block 80 and an outer peripheral surface of the terminal 81 to secure liquid-tightness between the inside and the outside of the oil jacket 1b. The second seal member 84 is preferably an O-ring, for example, similarly to the first seal member 83. By employing the first seal member 83 and the second seal member 84 in this manner, liquid-tightness can be secured between the case main body MC1 and the terminal block 80 and between the terminal block 80 and the terminal 81. As a result, situations can be prevented in which the cooling liquid leaks from the case MC1, MC2 or liquid, dust, and so on enter the case MC1, MC2.

According to this embodiment, the oil jacket 1 injects cooling liquid onto the outer peripheral surface 3a, the axial end surface 3b, and the inner peripheral surface 3c of the coil end CE, and therefore the coil end CE can be cooled effectively. In particular, by injecting the cooling liquid onto the axial end surface 3b of the coil end CE, the coils C of the respective phases, which are arranged in sequence from the inner peripheral surface 3c to the outer peripheral surface 3b of the coil end CE, can all be cooled by the cooling liquid. Furthermore, the injection holes ih can be provided to face each of the outer peripheral surface 3a, the axial end surface 3b, and the inner peripheral surface 3c of the coil end CE, and therefore the layout freedom of the injection holes ih can be increased in comparison with the related art. Moreover, the shape of the oil jacket 1 is designed to fit the shape of the coil end CE so that an insulating space can be disposed between the case MC1, MC2 and the coil end CE, and therefore increases in the size of the rotary electric machine M can be prevented.

Other Embodiments (1) In the embodiment described above, a plurality of the injection holes ih that inject the cooling liquid is provided in each of the outer periphery cooling portion 20, the end surface cooling portion 30, and the inner periphery cooling portion 40. Here, as shown in FIGS. 3 and 4, the injection holes ih are preferably formed such that the number of injection holes ih per unit area (in other words, the formation density) increases on a side close to a base of the coil end CE. By forming the injection holes ih in this manner, the base portion of the coil end CE can be cooled preferentially, and therefore the cooling effect on the stator core SC can be improved.

(2) In the embodiment described above, the outer periphery cooling portion 20 and the end surface cooling portion 30 include the cooling medium flow passage 50 through which the cooling liquid flows so as to be supplied in common to the plurality of injection holes ih. However, the scope of application of the present invention is not limited to this embodiment, and a constitution in which the cooling medium is individually supplied to the injection holes ih may of course be employed, in place of the constitution in which the cooling medium is supplied in common to the injection holes ih.

(3) In the embodiment described above, the outer periphery cooling portion 20 and the end surface cooling portion 30 are formed integrally such that the respective portions of the cooling medium flow passage 50 in the outer periphery cooling portion 20 and the end surface cooling portion 30 communicate with each other. However, the scope of application of the present invention is not limited to this embodiment, and each of the outer periphery cooling portion 20 and the end surface cooling portion 30 may of course have the cooling medium flow passage 50 that is independently formed, in place of the cooling medium flow passage 50 that is communicatively formed in the outer periphery cooling portion 20 and the end surface cooling portion 30. Furthermore, the outer periphery cooling portion 20 and the end surface cooling portion 30 may be formed separately.

(4) In the embodiment described above, the outer periphery cooling portion 20 is cylindrically formed covering the outer peripheral surface 3a of the coil end CE. However, the scope of application of the present invention is not limited to this embodiment. As shown in FIG. 2, the outer peripheral surface 3a of the coil end CE is formed such that a diameter thereof is smaller in a base portion of the coil end CE than a tip end portion. Hence, the outer periphery cooling portion 20 may of course be formed to fit the shape of the coil end CE such that the diameter of a portion facing the base portion of the coil end CE is reduced. In other words, the outer periphery cooling portion 20 may be formed such that a distance between the outer periphery cooling portion 20 and the outer peripheral surface 3a of the coil end CE is constant.

(5) In the embodiment described above, the oil jacket 1 also includes the inner periphery cooling portion 40 that is disposed along the inner peripheral surface 3c of the coil end CE and includes a plurality of the injection holes ih that inject the cooling liquid onto the inner peripheral surface 3c of the coil end CE. However, the scope of application of the present invention is not limited to this embodiment, and the inner periphery cooling portion 40 may be omitted such that the oil jacket 1 includes an L-shaped cross-section.

(6) In the embodiment described above, the inner periphery cooling portion 40 is formed integrally with the outer periphery cooling portion 20 and the end surface cooling portion 30. However, the scope of application of the present invention is not limited to this embodiment, and when the outer periphery cooling portion 20 and the end surface cooling portion 30 are formed integrally, the inner periphery cooling portion 40 may be formed separately to the outer periphery cooling portion 20 and the end surface cooling portion 30. Further, when the outer periphery cooling portion 20 and the end surface cooling portion 30 are formed separately, the inner periphery cooling portion 40 may be formed integrally with one of the outer periphery cooling portion 20 and the end surface cooling portion 30 or separately to both the outer periphery cooling portion 20 and the end surface cooling portion 30.

(7) In the embodiment described above, the rotor side end portion 41 of the inner periphery cooling portion 40 is formed distant from the axial end surface 70 of the rotor R. However, the scope of application of the present invention is not limited to this embodiment, and the rotor side end portion 41 of the inner periphery cooling portion 40 may of course be formed without being distant from the axial end surface 70 of the rotor R.

(8) In the embodiment described above, the inner periphery cooling portion 40 is cylindrically formed covering the inner peripheral surface 3c of the coil end CE. However, the scope of application of the present invention is not limited to this embodiment, and the inner periphery cooling portion 40 may of course be formed in other shapes.

(9) In the embodiment described above, the oil jacket 1 is positioned such that the outer periphery cooling portion 3*a* and the end surface cooling portion 3*b* are in surface contact with the inner wall MC1*a* of the case main body MC1 and the inner wall MC2*a* of the cover MC2. However, the scope of application of the present invention is not limited to this embodiment, and the oil jacket 1 may be positioned by providing a separate positioning member, for example.

(10) In the embodiment described above, the end surface cooling portion 30 of the second oil jacket 1*b* includes the terminal block 80 that supports the terminal 81 connected to the coil C. However, the scope of application of the present invention is not limited to this embodiment, and similarly to the first oil jacket 1*a* described above, the end surface cooling portion 30 of the second oil jacket 1*b* may be formed without providing the terminal block 80.

(11) In the embodiment described above, the terminal block 80 is supported in the outside communication hole 82 via the first seal member 82, and the terminal 81 is supported by the terminal block 80 via the second seal member 83. However, the scope of application of the present invention is not limited to this embodiment, and the terminal block 80 and the terminal 81 may be supported using other constitutions, such as welding.

(12) In the embodiment described above, the cooling liquid outlet port 71 of the first oil jacket 1*a* is formed by partially cutting away the outer periphery cooling portion 20, and the cooling liquid outlet port 71 of the second oil jacket 1*b* is formed by providing an opening portion in a portion of the end surface cooling portion 30. However, the scope of application of the present invention is not limited to this embodiment, and the cooling liquid outlet ports 71 of both the first oil jacket 1*a* and the second oil jacket 1*b* may be formed in one or both of the outer periphery cooling portion 20 and the end surface cooling portion 30.

The present invention may be used in various well-known rotary electric machines including a stator having a coil and a cooling unit that cools a coil end of the coil, which projects in an axial direction of the stator.

What is claimed is:

1. A rotary electric machine having a stator comprising:
    a coil; and
    a cooling unit that cools a coil end of the coil, which projects in an axial direction of the stator, wherein:
    the cooling unit includes:
        an outer periphery cooling portion that is disposed along an outer peripheral surface of the coil end and includes a plurality of injection holes that inject a cooling medium onto the outer peripheral surface; and
        an end surface cooling portion that is disposed along an axial end surface of the coil end and includes a plurality of injection holes that inject the cooling medium onto the axial end surface,
    the outer periphery cooling portion and the end surface cooling portion include a cooling medium flow passage through which the cooling medium flows so as to be supplied in common to the plurality of injection holes,
    the outer periphery cooling portion and the end surface cooling portion are formed integrally to cover the outer peripheral surface and the axial end surface of the coil end such that respective portions of the cooling medium flow passage in the outer periphery cooling portion and the end surface cooling portion communicate with each other, and
    the cooling unit is formed from an insulating material and disposed in an insulating space between a case housing the stator and the coil end.

2. The rotary electric machine according to claim 1, wherein the outer periphery cooling portion is cylindrically formed covering the outer peripheral surface of the coil end.

3. The rotary electric machine according to claim 2, wherein the end surface cooling portion is formed in an annular disc shape covering the axial end surface of the coil end.

4. The rotary electric machine according to claim 3, wherein the cooling unit includes a radial cross-section formed in a U shape so as to cover the outer peripheral surface, the axial end surface, and an inner peripheral surface of the coil end integrally.

5. The rotary electric machine according to claim 4, wherein the cooling unit further includes an inner periphery cooling portion that is disposed along the inner peripheral surface of the coil end and includes a plurality of injection holes that inject the cooling medium onto the inner peripheral surface of the coil end.

6. The rotary electric machine according to claim 5, wherein the inner periphery cooling portion is formed integrally with the outer periphery cooling portion and the end surface cooling portion.

7. The rotary electric machine according to claim 6, further comprising a rotor supported rotatably on a radially inner side of the stator, wherein
    a rotor side end portion of the inner periphery cooling portion is formed distant from an axial end surface of the rotor.

8. The rotary electric machine according to claim 7, wherein the inner periphery cooling portion is cylindrically formed covering the inner peripheral surface of the coil end.

9. The rotary electric machine according to claim claim 8, wherein the cooling unit is positioned such that the outer periphery cooling portion and the end surface cooling portion are in surface contact with an inner wall of the case.

10. The rotary electric machine according to claim 9, wherein the end surface cooling portion includes a terminal block that supports a terminal connected to the coil.

11. The rotary electric machine according to claim 10, wherein
    the case housing the stator includes an outside communication hole communicating with the outside,
    the terminal block is supported in the outside communication hole via a first seal member, and
    the terminal is supported by the terminal block via a second seal member.

12. The rotary electric machine according to claim 1, wherein the outer periphery cooling portion is cylindrically formed covering the outer peripheral surface of the coil end.

13. The rotary electric machine according to claim 1, wherein the end surface cooling portion is formed in an annular disc shape covering the axial end surface of the coil end.

14. The rotary electric machine according to claim 1, wherein the cooling unit includes a radial cross-section formed in a U shape so as to cover the outer peripheral surface, the axial end surface, and an inner peripheral surface of the coil end integrally.

15. The rotary electric machine according to claim 1, wherein the cooling unit further includes an inner periphery cooling portion that is disposed along an inner peripheral surface of the coil end and includes a plurality of injection holes that inject the cooling medium onto the inner peripheral surface of the coil end.

16. The rotary electric machine according to claim 15, wherein the inner periphery cooling portion is formed integrally with the outer periphery cooling portion and the end surface cooling portion.

17. The rotary electric machine according to claim 16, further comprising a rotor supported rotatably on a radially inner side of the stator, wherein
a rotor side end portion of the inner periphery cooling portion is formed distant from an axial end surface of the rotor.

18. The rotary electric machine according to claim 17, wherein the inner periphery cooling portion is cylindrically formed covering the inner peripheral surface of the coil end.

19. The rotary electric machine according to claim 1, wherein the cooling unit is positioned such that the outer periphery cooling portion and the end surface cooling portion are in surface contact with an inner wall of the case.

20. The rotary electric machine according to claim 1, wherein the end surface cooling portion includes a terminal block that supports a terminal connected to the coil.

21. The rotary electric machine according to claim 20, wherein
the case housing the stator includes an outside communication hole communicating with the outside,
the terminal block is supported in the outside communication hole via a first seal member, and
the terminal is supported by the terminal block via a second seal member.

* * * * *